United States Patent [19]

Sage et al.

[11] Patent Number: 5,130,049
[45] Date of Patent: Jul. 14, 1992

[54] THERMOCHROMIC ESTERS

[75] Inventors: Ian C. Sage; Robert W. Clemitson, both of Dorset, Great Britain

[73] Assignee: Merck Patent Gesellschaft Mit Beschrankter Haftung, Darmstadt, Fed. Rep. of Germany

[21] Appl. No.: 378,517

[22] PCT Filed: May 5, 1989

[86] PCT No.: PCT/EP89/00503

§ 371 Date: Jun. 19, 1989

§ 102(e) Date: Jun. 19, 1989

[87] PCT Pub. No.: WO89/10914

PCT Pub. Date: Nov. 16, 1989

[30] Foreign Application Priority Data

May 13, 1988 [GB] United Kingdom ............... 8811374

[51] Int. Cl.⁵ .................. C09K 19/30; C09K 19/20
[52] U.S. Cl. ...................... 252/299.63; 252/299.67
[58] Field of Search ................. 252/299.63, 299.67

[56] References Cited

U.S. PATENT DOCUMENTS

| | | | |
|---|---|---|---|
| 4,149,413 | 4/1979 | Gray et al. | 252/299.63 X |
| 4,361,494 | 11/1982 | Osman et al. | 252/299.63 |
| 4,501,503 | 2/1985 | Buirley et al. | 350/351 X |
| 4,874,544 | 10/1989 | Yong et al. | 252/299.61 |
| 4,943,384 | 7/1990 | Sucron et al. | 252/299.61 |

FOREIGN PATENT DOCUMENTS

| | | | |
|---|---|---|---|
| 0154849 | 9/1985 | European Pat. Off. | 252/299.61 |
| 2022889 | 1/1987 | Japan . | |
| 62-22889 | 7/1987 | Japan . | |
| WO8505467 | 12/1985 | PCT Int'l Appl. | 350/351 |

OTHER PUBLICATIONS

Grant & Hackh's Chemical Dictionary/5th Edition., Roger Grant and Claire Grant; 1987; p. 402.
S. M. Kelly et al., Ferroelectrics 1988, vol. 86, 300.
S. M. Kelly et al., Helv. Chim. Acta, vol. 71 (1988), 451-460.

Primary Examiner—Robert L. Stoll
Assistant Examiner—C. Harris
Attorney, Agent, or Firm—Millen, White & Zelano

[57] ABSTRACT

The invention relates to liquid crystalline compounds of the Formula I $$R^1-\underset{}{\bigcirc}-CH_2-O-\underset{(X^1)_n}{\bigcirc}-CO-O-\underset{(X^2)_m}{\bigcirc}-R^2 \quad (I)$$

wherein $R^1$, $R^2$, $X^1$, $X^2$, m, and n are as defined herein. Preferably, the group $R^2$ of the liquid crystalline compounds of Formula I is a chiral residue of the formula II $$-Q-\underset{\underset{CH_3}{|}}{CH}-Y \quad (II)$$

wherein

Q denotes an alkylene residue with up to 7 C atoms wherein one $CH_2$ group may be replaced by —O—, —CO—O—, or —O—CO—, or a single bond; and Y denotes an alkyl residue with 2 to 7 C atoms wherein one $CH_2$ group may be replaced by —O—, —CO—O—, or —O—CO—.

The invention further relates to liquid crystal phases containing compounds of the Formula I, to electro-optic and thermographic devices, and to a method of surface thermography.

13 Claims, No Drawings

THERMOCHROMIC ESTERS

SUMMARY OF THE INVENTION

The invention relates to liquid crystalline compounds of the formula I

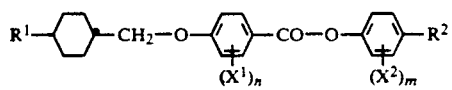

wherein $R^1$ and $R^2$ are each independently a normal or branched alkyl residue with up to 16 C atoms or a normal or branched alkenyl residue with 3 to 16 C atoms wherein one or two non-adjacent $CH_2$ groups of these residues may be replaced by —O—, —CO—, —O—CO— or —CO—O—, $X^1$ and $X^2$ are each independently a methyl group or an halogen atom, n and m are each independently 0, 1, 2, 3 or 4.

Liquid crystal phases are exhibited by certain organic compounds and constitute an intermediate state which exists between the crystalline solid and the fully disordered liquid phase and within which certain long range ordering of the molecules takes place.

There are two broad types of liquid crystal phase; the smectic mesophase in which the long range ordering is of a substantially lamellar type and the nematic mesophase in which the ordering is substantially linear, i.e., the molecules tend to line up with the long axes of the molecules parallel. Included sometimes as a subclass of the nematic mesophase and sometimes classified as a separate mesophase is the cholesteric mesophase. This last has a helical long range order imposed upon the linear order of the nematic mesophase. Compounds displaying a cholesteric mesophase are optically active (chiral) and the pitch of the helical twist is determined by the nature and extent of the optical activity. The pitch of the helical twist may be such that thin films of the cholesteric phase reflect visible light, resulting in the observation of bright colors, and the pitch may also be sharply temperature dependent resulting in the reflection of particular colors over particular temperature ranges so that the cholesteric mesophase in question can act as a "thermometer". This behavior is known as thermochromism.

The chiral compounds of the formula I exhibit a cholesteric mesophase (hereinafter designated Ch) because of their molecular shape and optical activity and also a chiral smectic C mesophase (hereinafter designated $S_c$) underlying the cholesteric mesophase. They exhibit, either on their own or when mixed with one or more compounds capable of forming $S_c$ liquid crystal phases, a chiral $S_c$ liquid crystal phase in which the molecules lie tilted in the smectic layers which are themselves superimposed one upon the other to give a helical distribution of the tilt angles on passing through a stack of layers. A unique feature of the chiral $S_c$ phases of the compounds of the present invention is that, in their planar $S_c$ textures, these mesophases have a helical pitch which gives a selective reflection of colored light of specific wavelengths which are dependent on temperature, i.e., the compounds are thermochromic.

Also, above the $S_c$-Ch transition, the compounds of the present invention exhibit, either on their own or when mixed with one of more other liquid crystal compounds, a cholesteric liquid crystal phase in which the molecules are arranged in the helical formulation of that phase such that a film of the phase in the Grandjean plane texture rotates the plane of polarization of incident polarized light and reflects elliptically polarized light of specific wavelengths when illuminated by ordinary light, so that the mesophases are thermochromic.

The compounds of the present invention have properties such that they may be used in a liquid crystal electrooptic device such as a "phase change" device in which the material is changed between a so-called "focalconic" cholesteric state, which scatters light, and a transparent nematic state by an applied electric field and in accordance with one aspect of the present invention an electro-optic device includes in its liquid crystalline material a compound as hereinbefore defined. It will of course be realized that there may be present, a mixture (solution) of compounds as hereinbefore defined and that other compounds exhibiting liquid crystalline behavior may be included. Preferably the mixture of compounds used is a eutectic. The optical effect of the electro-optical device may be enhanced by the inclusion of pleochroic dyes. Su table pleochroic dyes for this purpose are described in UK patent Ser. No. 1,555,954 and No. 1,555,955.

In accordance with a second aspect of the present invention an electro-optic display device includes as its liquid crystalline material a wide range chiral $S_c$ phase composed of a mixture (solution) of the compounds hereinbefore defined such that the selectivity light reflecting (i.e. colored) chiral $S_c$ phase is converted to a nonlight reflecting, homeotropic (colorless) condition by an applied electric field. That is to say the pitch of the $S_c$ planar structure is effectively unwound by an external electric field which changes the tilt orientation of molecules such that they finally adopt an orthogonal orientation with respect to the layers.

Compounds of the present invention exhibit both a chiral $S_c$ phase and a Ch phase at higher temperatures and mixtures of such materials may exhibit thermochromism in both mesophases. This occurs, it is believed, because the helical pitch lengths of the molecular formations are such as to give strongly temperature dependent Bragg reflection of particular wavelengths of light in the visible spectral region. That is, the materials appear colored with a color which varies with the temperature of the material. The sequence of colors given with changing temperature in one direction by the cholesteric phase is the reverse of that given by the chiral $S_c$ phase. The materials of the present invention and mixtures thereof may thus be used in surface thermography, e.g., for the detection of breast cancer. They may be applied in a thin film on the surface of interest. The color of the film in reflection at right angles to the surface indicates the temperature of the surface.

This last mentioned property may be used to produce a temperature sensitive display device, e.g. a thermometer, giving a visual display resulting from the effect of changes of temperature upon the helical pitch of the material and consequently the reflected color.

The compounds of the formula I are covered by a broad formula of the Japanese Patent Application J 61,087,777. But no compound according to the invention is described there. No one skilled in the art, therefore, could infer how to synthesize these compounds or recognize that they show favorable mesophase ranges and a extraordinarily high stability against light, especially UV.

Similar compounds, e.g., are described in the UK Patent Ser. No. 1,603,076 which discloses chiral biphenyl, cuclohexyl and benzoyloxyphenyl esters of (+)-4-(2'-methylbutyl)-phenol.

A great disadvantage for many applications of these materials is their low chemical, heat and light, especially UV, stability. Another adverse property of phases based on these compounds is that high order smectic phases such as, for example, $S_j$, occur at low temperatures, so that the switching time properties are adversely influenced and/or the pitch and/or the tilt and/or the viscosity of the phases do not meet the requirements of display technology.

It has now been found that the compounds of the formula I can substantially reduce the disadvantages mentioned.

The compounds of the formula I are thus outstandingly suitable as components of liquid crystal phases, especially of cholesteric phases. In particular cholesteric phases prepared by the aid of these compounds are chemically stable, have favorable viscosity values, and broad Ch phase ranges without occurrence of high order smectic phases.

The compounds of the formula I have a wide range of applications. Depending on the choice of substituents, these compounds can be used either as base materials from which liquid crystal cholesteric phases are predominantly composed or as optically active additives which induce the cholesteric phase in a nematic phase, however, it is also possible for compounds of the formula I to be added to liquid crystal base materials from other classes of compounds, for example, in order to vary the dielectric and/or optical anisotropy and/or the viscosity and/or the phase ranges and/or the tilt angle and/or the pitch of such a dielectric.

The invention thus relates to compounds of the formula I, in particular to compounds of the formula I wherein $R^2$ is a chiral residue of the formula II

wherein

Q denotes an alkylene residue with up to 7 C atoms wherein one $CH_2$ group may be replaced by -O-, -CO-O- or -O-CO-, or a single bond, Y denotes an alkyl residue with 2 to 7 C atoms wherein one CH2 group may be replaced by —O—, —CO—O— or —O—CO—.

The invention relates furthermore to a liquid crystalline phase with at least two components, characterised in that at least one component is a compound of the formula I.

The invention relates furthermore to an electro-optic device containing such a liquid crystalline phase and to a temperature indicating device containing such a liquid crystalline phase.

Eventually the invention relates to a method of surface thermography which includes the step of (a) applying a thin film of a compound of the formula I or a liquid crystalline phase containing a compound of the formula I to a surface and (b) observing the color of the film in reflection at right angles to the surface.

For simplicity, in the following text, Phe denotes an unsubstituted 1,4-phenylene group, PheX a 1,4-phenylene group substituted by up to four methyl groups and/or halogen atoms and Cyc denotes a trans-1,4-cyclohexylene group.

Preferred compounds of the formula I are those of the part formulae Ia to Id:

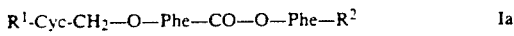

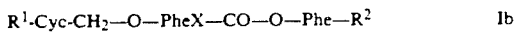

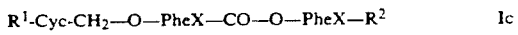

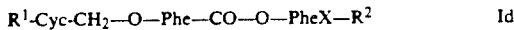

In the compounds of the part formulae Ib to Id PheX denotes a 1,4-phenylene group substituted by up to four methyl groups or halogen atoms. Preferred are those compounds wherein PheX denotes a 1,4-phenylene group substituted by one or two halogen atoms. Particularly preferred are compounds wherein PheX denotes a 2-(3-)fluoro-1,4-phenylene group.

If $R^1$ and $R^2$ are each an alkyl residue and/or alkoxy residue, this radical can be straight-chain or branched. Preferably, it is straight-chain and has 2, 3, 4, 5, 6 or 7 C atoms and is accordingly preferably ethyl, propyl, butyl, pentyl, hexyl, heptyl, ethoxy, propyloxy, butyloxy, pentyloxy, hexyloxy or heptyloxy, also methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6-, or 7-oxaoctyl, 2-, 3-, 4-, 5-, 6-, 7- or 8-oxanonyl or 2-, 3-, 4-, 5-, 6-, 7-, 8- or 9-oxadecyl.

If $R^1$ and $R^2$ are each an alkenyl residue, it can be straight-chain or branched. Preferably, it is straight-chain and has 2 to 10 C atoms. It is accordingly, in particular, vinyl, prop-1- or prop-2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl or dec-1-, -2-, -3-, -4-, -5-, -6-, -7-, -8- or -9-enyl.

Compounds of the formula I with branched terminal residues $R^1$ and $R^2$ can occasionally be of importance because of an improved solubility in the customary liquid crystal base materials, but in particular as chiral doping substances if they are optically active.

Branched groups of this type as a rule contain not more than one chain branching. Preferred branched residues $R^1$ and $R^2$ are isopropyl, 2-butyl (=1-methylpropyl), isobutyl (=2-methylpropyl), 2-methylbutyl, isopentyl (=3-methyl-butyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methyl-pentoxy, 2-ethylhexoxy, 1-methylhexoxy and 1-methyl-heptoxy.

Formula I includes both the racemates of these compounds and the optical antipodes, as well as the mixtures thereof.

Those of the compounds of the formulae I, Ia to Id in which at least one of the residues contained therein has one of the preferred meanings mentioned are preferred.

Compounds of the formula I wherein the residue $R^2$ denotes a chiral group of the formula II

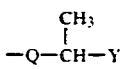

are preferred.

Preferred chiral groups of the formula II are those of the part formulae IIa to IIk:

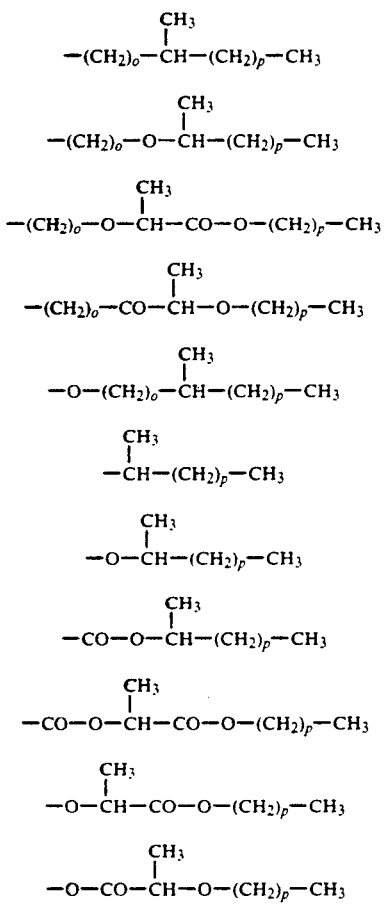

In the groups of the formulae IIa to IIk o and p each are 1 to 6.

Particularly preferred are those compounds of the formula I wherein the residue $R^2$ denotes a chiral group of the subformulae IIa, IIc, IId, IIf, IIg, IIi or IIk.

The compounds of the formula I are prepared by methods which are known per se, such as are described in the literature (for example in the standard works, such as Houben-Weyl, Methoden der Organischen Chemie [Methods of Organic Chemistry], Georg-Thieme-Verlag, Stuttgart), and in particular under reaction conditions which are known and suitable for the reactions mentioned in more detail here can also be used in this connection.

If desired, the starting substances can also be formed in situ, such that they are not isolated from the reaction mixture but are immediately reacted further to give the compounds of the formula I.

Esters of the formula I can be obtained by esterification of corresponding carboxylic acids (or their reactive derivatives) with alcohols or phenols (or their reactive derivatives) preferably the corresponding carboxylic acid and the alcohol or phenol are reacted with water absorbing means as, for example, mol sieves or carbodiimides, particularly preferably with dicyclohexylcarbodiimide.

The corresponding carboxylic acids and alcohols or phenols are known or can be prepared by processes analogous to known processes.

Particularly suitable reactive derivatives of the carboxylic acids mentioned are the acid halides, above all the chlorides and bromides, and furthermore the anhydrides, for example also mixed anhydrides, preferably those of the corresponding carboxylic acids and trifluoroacetic acid formed in situ by mixing these carboxylic acids with trifluoroacetic anhydride, azides or esters, in particular alkyl esters with 1-4 C atoms in the alkyl group.

Possible reactive derivatives of the alcohols or phenols mentioned are, in particular, the corresponding metal alcoholates or phenolates, preferably of an alkali metal, such as sodium or potassium.

The esterification is advantageously carried out in the presence of an inert solvent. Particularly suitable solvents are ethers, such as diethyl ether, di-n-butyl ether, THF, dioxane or anisole, ketones, such as acetone, butanone or cyclohexanone, amides, such as dimethylformamide or phosphoric acid hexamethyltriamide, hydrocarbons, such as benzene, toluene or xylene, halogenohydrocarbons, such as carbon tetrachloride, dichlormethane or tetrachloroethylene, and sulfoxides, such as dimethylsulfoxide or sulfolane. Water-immiscible solvents can simultaneously be advantageously used for azeotropic distillation of the water formed during the esterification. An excess of an organic base, for example pyridine, quinoline or triethylamine, can occasionally also be used as the solvent for the esterification. An additional, catalytic amount of 4-(N,N-dimethylamino)-pyridine can accelerate the esterification. The esterification can also be carried out in the absence of a solvent, for example by heating the components in the presence of sodium acetate. The reaction temperature is usually between $-50°$ and $+250°$, preferable between $-20°$ and $+80°$. At these temperatures, the esterification reactions have as a rule ended after 15 minutes to 48 hours.

In detail, the reaction conditions for the esterification depend largely on the nature of the starting substances used. Thus, a free carboxylic acid is as a rule reacted with a free alcohol or phenol in the presence of a strong acid, for example a mineral acid, such as hydrochloric acid or sulfuric acid. A preferred reaction procedure is the reaction of an acid anhydride or, in particular, an acid chloride with an alcohol, preferably in a basic medium, bases which are of importance being, in particular, alkali metal hydroxides, such as sodium hydroxide or potassium hydroxide, alkali metal carbonates or bicarbonates, such as sodium carbonate, sodium bicarbonate, potassium carbonate or potassium bicarbonate, alkali metal acetates, such as sodium acetate or potassium acetate, alkaline earth metal hydroxides, such as calcium hydroxide, or organic bases, such as triethylamine, pyridine, lutidine, collidine or quinoline. Another preferred embodiment of the esterification comprises first converting the alcohol or phenol into the sodium alcoholate or phenolate or potassium alcoholate or phenolate, for example by treatment with ethanolic sodium hydroxide solution or potassium hydroxide solution, isolating this product and suspending it in acetone or diethyl ether, together with sodium bicarbonate or potassium carbonate, with stirring, and adding a solution of the acid chloride or anhydride in diethyl ether, acetone or diemthylformamide to this suspension, advantageously at temperatures between about −25° and +20°. Alkoxy compounds of the formula I ($R^2$ = O-alkyl, Cyc-$CH_2$-O-Phe) can be obtained by alkylation of the corresponding phenols (Rhu 1-Cyc-$CH_2$-O-Phe-CO-O-Phe-OH, HO-Phe-CO-O-Phe-$R^2$), the phenol preferably first being converted into a phenolate for example into the alkali metal phenolate by treatment with NaOH, KOH, $Na_2CO_3$ or $K_2CO_3$. This phenolate can then be reacted with the corresponding alkyl halide or sulfonate or dialkylsulfate, preferably in an inert solvent such as acetone, DMF or dimethylsulfoxide or an excess of aqueous or aqueous-alcoholic NaOH or KOH at temperatures between 0° and 100° C.

In the case that a chiral group of the part formulae IIe, IIg or IIj is to be connected with a phenol, the corresponding optically active alcohol and the corresponding phenol are treated with triphenyl phosphine and diethyl azodicarboxylate as described by O. Mitsunobu, Synthesis 1981, 1.

The liquid crystalline mixtures according to the invention consist of 3 to 25, preferably 4 to 15, components, at least one of which is a compound of the formula I. The other constitutents are preferably chosen from nematic or nematogenic substances, in particular the known substances, from the classes of azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylcyclohexenes. cyclhexylnaphthalenes, 1,4-biscyclohexylbenzenes, 4,4'-biscyclohexylbiphenyls, phenyl- or cyclohexylpyrimidines, phenylpyridines, phenyl- or cyclohexyldioxanes, phenyl- or cyclohexyldithianes, 1,2-bis-phenylethanes, 1,2-biscyclohex-ylethanes. 1-phenyl-2-cyclohexylethanes, optionally halogenated stilbenes, benzyl phenyl ethers, tolanes and substituted cinnamic acids.

The most important compounds which are possible constituents of such liquid crystalline mixtures can be characterized by the formula 1

$R^3$—L—G—E—$R^4$  1 wherein L and E are each an unsubstituted or laterally fluoro- or cyano- substituted carbo- or hetero-cyclic ring system from-the group comprising 1,4-disubstituted benzene and cyclohexane rings, 1,4-disubstituted 1-cyano-cyclohexane rings, 4,4-disubstituted biphenyl, phenyl-cyclohexane and cyclohexylcyclohexane systems, 2,5-di-substituted naphthalene, di- and tetra-hydronaphthalene, quinazoline and tetrahydroquinazoline, G is

| | |
|---|---|
| —CH=CH— | —N(O)=N— |
| —CH=CY— | —CH=N(O)— |
| —C≡C— | —$CH_2$—$CH_2$— |
| —CO—O— | —$CH_2$—O— |
| —CO—S— | —$CH_2$—S— |
| —CH=N— | —COO-Phe-COO— | or a C—C single bond, Y is halogen, preferably chlorine, or —CN and $R^3$ and $R^4$ are alkyl, alkoxy, alkanoyloxy or alkoxycarbonyloxy with up to 18, preferably up to 8, carbon atoms, it also being possible for one $CH_2$ group non-adjacent to an oxygen atom to be replaced by —O—, —CH=CH— or —C≡C—, or that one of the radicals $R^3$ and $R^4$ may also denote CN, $NO_2$, $CF_3$, NCS, F, Cl or Br.

In most of these compounds, $R^3$ and $R^4$ are different from one another, one of these radicals usually being an alkyl or alkoxy group. However, other variants of the substituents envisaged can also be used. Many such substances or mixtures thereof are commercially available. All of these substances can be prepared by methods which are known from the literature.

The liquid crystalline mixtures according to the invention contain about 0.5 to 100, preferably 15 to 100%, of one or more compounds of the formula I. Liquid crystalline mixtures which contains 25–100, particular 30–90%, of one or more compounds of the formula I can be used advantageously in the mixtures according to the invention.

The liquid crystalline mixtures according to the invention are prepared in a manner which is customary per se. As a rule, the components are dissolved in one another, preferably at elevated temperature.

The liquid crystalline mixtures according to the invention can be modified by suitable additives such that they can be used in all the types of liquid crystal display elements disclosed to date.

Such additives are known to the expert and are described in detail in the literature. For example, it is possible to add conductive salts, preferably ethyldimethyldodecylammonium 4-hexyloxybenzoate, tetrabutylammonium tetraphenylboranate or complex salts of crown ethers (compare, for example, I. Haller et al., Mol.Cryst.Liq.Cryst. Volume 24, pages 249–258 (1973)) for improving the conductivity, dichoric dyestuffs for the production of colored guest/host systems or substances for changing the dielectric anisotropy, the viscosity and/or the orientation of the nematic phases. Such substances are described, for example, in German Offenlegungsschrift 2,209,127, 2,240,863, 2,321,632, 2,338,281, 2,450,088, 2,637,430, 2,853,728 and 2,902,177.

The thermochromic cholesteric liquid crystals according to the invention are suitable for the thermometry, especially for a good indication of core body temperature in sleeping children and postoperative patients.

Furthermore they can be advantageously applied to the biomedical thermography as an important diagnostic aid for breast cancer detection or placental location.

Beneath mood indicating jewellery U.S. Pat. No. 3,802,945 (1979) and nondestructive testing applications they can be used in atmospheric pollutant detection because of the effect of impurities on the selective reflection wavelength of the liquid crystalline mixtures according to the invention.

EXAMPLES

The following examples are intended to illustrate the invention without limiting it. Percentages above and below are percentages by weight. All the temperatures are given in degrees Centigrade. The symbols are furthermore as follows: Cr: crystalline solid state, S: smectic phase (the index characterizes the phase type), N: nematic phase, Ch: cholesteric phase, I: isotropic phase. The figure between two symbols indicates the transition temperature.

EXAMPLE 1

Preparation of (S)-4-(2-methylbutyl)-phenyl 4-(trans-4-alkylcyclohexylmethoxy)-benzoates Optically active 4-(2-methylbutyl)-phenol (0.5 mol, cyclohexyl-methoxy)-benzoic acid (0.5 mol, obtained by reaction of p-hydroxybenzoic acid, trans-4-pentylcyclohexylmethylbromide and sodium ethanolate in ethanol) are added to a mixture of dicyclohexylcarbodiimide (0.55 mol) and dichloromethane (500 ml). After storage at room temperature for 16 hours the mixture is filtered and the solid is washed with dichloromethane (70 ml). The combined filtrates are washed with water and dried over anhydrous magnesium sulfate. After purifying by chromatography and crystallization optically active (S)-4-(2-methylbutyl)-phenyl 4-(trans-4-pentylcyclohexylmethoxy)-benzoate is obtained as a solid, Cr. 78° $S_A$ 112° Ch, 133° I with a pitch length of 0.3 μm and a dextro sense of the Ch-helix.

Lit. 1: D. Coates, G. W. Gray, D. G. McDonnell, UK patent Ser. No. 1,603,076

The following chiral compounds are obtained analogously:

(S)-4-(2-methylbutyl)-phenyl 4-(trans-4-ethylcyclohexyl-methoxy)-benzoate
(S)-4-(2-methylbutyl)-phenyl 4-(trans-4-propylcyclohexyl-methoxy)-benzoate
(S)-4-(2-methylbutyl)-phenyl 4-(trans-4-butylcyclohexyl-methoxy)-benzoate
(S)-4-(2-methylbutyl)-phenyl 4-(trans-4-hexylcyclohexyl-methoxy)-benzoate
(S)-4-(2-methylbutyl)-phenyl 4-(trans-4-heptylcyclohexyl-methoxy)-benzoate
(S)-4-(2-methylbutyl)-phenyl 4-(trans-4-octylcyclohexyl-methoxy)-benzoate With optically active 4-(2-methylbutyl)-difluorphenol (obtained by reacting 4-ethoxy-2,3-difluorphenylpotassium with optically active 2-methylbutylbromide in tetrahydrofuran/dimethylpropylene urea followed by ether cleavage with aluminium trichloride) the following chiral compounds are obtained analogously:

(S)-4-(2-methylbutyl)-2,3-difluorophenyl 4-(trans-4-ethylcyclohexylmethoxy)-benzoate
(S)-4-(2-methylbutyl)-2,3-difluorophenyl 4-(trans-4-propylcyclohexylmethoxy)-benzoate
(S)-4-(2-methylbutyl)-2,3-difluorophenyl 4-(trans-4-butylcyclohexylmethoxy)-benzoate
(S)-4-(2-methylbutyl)-2,3-difluorophenyl 4-(trans-4-pentylcyclohexylmethoxy)-benzoate
(S)-4-(2-methylbutyl)-2,3-difluorophenyl 4-(trans-4-hexylcyclohexylm-ethoxy)-benzoate
(S)-4-(2-methylbutyl)-2,3-difluorophenyl 4-(trans-4-heptylcyclohexylmethoxy)-benzoate
(S)-4-(2-methylbutyl)-2,3-difluorophenyl 4-(trans-4-octylcyclohexylmethoxy)-benzoate

EXAMPLE 2

Mixtures are made of (S)-4-(2-methylbutyl)-phenyl 4-(trans-4-pentylcyclohexylmethoxy)-benzoate with a mixture of optically active methylbutylphenyl 4-alkoxybenzoates commercially available under the name TM81A from BDH Limited. The temperature of the thermochroic color play of each of the mixtures is measured, with the following results:

| | % additive | | | | |
|---|---|---|---|---|---|
| | 0% | 5% | 10% (TM81A) | 15% | 20% |
| Visible start | 36.1° | 38.9° | 41.8° | 45.0° | 48.3° |
| Red | 36.3° | 39.1° | 42.0° | 45.2° | 48.4° |
| Orange | 36.5° | 39.3° | 42.2° | 45.4° | 48.1° |
| Yellow | 36.6° | 39.4° | 42.3° | 45.5° | 48.7° |
| Light green | 36.6° | 39.4° | 42.4° | 45.6° | 48.8° |
| Bright green | 36.7° | 39.5° | 42.5° | 45.6° | 48.9° |

-continued

| | % additive | | | | |
|---|---|---|---|---|---|
| | 0% | 5% | 10% (TM81A) | 15% | 20% |
| Turquoise | 36.8° | 39.6° | 42.6° | 45.7° | 49.0° |
| Light blue | 36.9° | 39.8° | 42.7° | 45.8° | 49.1° |
| Dark blue | 37.0° | 40.1° | 43.2° | 46.3° | 49.5° |
| Purple | 37.4° | 40.5° | 43.9° | 46.7° | 49.8° |
| Colourless | 40.0° | 46.5° | 49.6° | 51.5° | 55.5° |
| Width | 0.7° | 0.7° | 0.6° | 0.7° | 0.7° |

EXAMPLE 3

Mixtures are formulated containing the following components

| Mixture 1: | |
|---|---|
| (S)-4-methylbutylphenyl 4-heptylbiphenyl-4-carboxylate | 10% |
| (S)-4-methylbutylphenyl 4-hexyloxybenzoate | 29.63% |
| (S)-4-methylbutylphenyl 4-octyloxybenzoate | 10.04% |
| (S)-4-methylbutylphenyl 4-decyloxybenzoate | 15.53% |
| (S)-4-methylbutylphenyl 4-dodecyloxybenzoate | 18.48% |
| 4-pentylphenyl 4-octyloxybenzoate | 16.33% |

| Mixture 2: | |
|---|---|
| (S)-4-(2-methylbutyl)-phenyl 4-(trans-4-pentyl-cyclohexylmethoxy)-benzoate | 10% |
| (S)-4-methylbutylphenyl 4-hexyloxybenzoate | 20.80% |
| (S)-4-methylbutylphenyl 4-octyloxybenzoate | 10.04% |
| (S)-4-methylbutylphenyl 4-decyloxybenzoate | 15.53% |
| (S)-4-methylbutylphenyl 4-dodecyloxybenzoate | 27.30% |
| 4-pentylphenyl 4-octyloxybenzoate | 16.33% |

Mixture 2 is an embodiment of the invention, while mixture 1 is a comparative example which does not embody the invention but is representative of prior art. The color play of each of the mixtures is measured, and a thin film (ca. 10 microns) pressed between microscope cover slips is exposed to filtered Xenon arc radiation simulating sunlight in a Heraeus Sun Test machine for 1 hour. The temperature of color play for the irradiated samples is again measured with the following results:

| | Mixture 1 Before Irradiation | Mixture 1 After Irradiation | Mixture 2 Before Irradiation | Mixture 2 After Irradiation |
|---|---|---|---|---|
| Visible start | 43.3° C. | — | 45.3/4° C. | 44.8° C. |
| Red | 43.4/5° C. | 36.0 | 45.5° C. | 45.0° C. |
| Orange | 43.6° C. | — | 45.5/6° C. | 45.0/1° C. |
| Yellow | 43.7° C. | — | 45.0/6° C. | 45.0/1° C. |
| Light green | 43.7/8° C. | — | 45.8° C. | 45.2/3° C. |
| Bright green | 43.9° C. | — | 45.9° C. | 45.3/4° C. |
| Turquoise | 44.1° C. | — | 46.0° C. | 45.4/5° C. |
| Light blue | 44.3/4° C. | — | 46.1° C. | 45.6° C. |
| Dark blue | 44.6/7° C. | 41.5° C. | 46.2/3° C. | 45.7/8° C. |
| Purple | 45.5° C. | 42.1° C. | 46.6/7° C. | 46.0° C. |
| Colourless | 52.5° C. | 48.5° C. | 50.4° C. | 50.3° C. |
| Width | 0.9° C. | — | 0.6° C. | 0.6° C. |

After irradiation Mixture 1 shows selective reflection of greatly decreased brightness, and the correspondence between temperature and reflected color has lost. By contrast the mixture 2 embodying the inventions retains a bright thermochromic selective reflection, indicating a considerably superior stability to visible and UV irradiation.

We claim:

1. A liquid crystalline phase comprising at least two components, wherein at least one component is a compound of the formula I $$R^1-\text{Cyc}-CH_2-O-\text{Phe}(X^1)_n-CO-O-\text{Phe}(X^2)_m-R^2 \quad (I)$$

wherein
- $R^1$ is a normal or branched alkyl residue with up to 16 C atoms or a normal or branched alkenyl residue with 3 to 16 C atoms wherein one or two non-adjacent $CH_2$ groups of these resides may be replaced by $-O-$, $-CO-$, $-O-CO-$ or $-CO-O$;
- $R^2$ is a chiral residue of the formula II $$-Q-\underset{\underset{CH_3}{|}}{CH}-Y \quad (II)$$

wherein
- Q is an alkylene residue with up to 7 C atoms wherein one $CH_2$ group may be replaced by $-O-$, $-CO-O-$ or $-O-CO-$, or is a single bond;
- Y is an alkyl residue with 2 to 7 C atoms wherein one $CH_2$ group may be replaced by $-O-$, $-CO-O-$ or $-O-CO$;
- $X^1$ and $X^2$ are each independently a methyl group or a halogen atom; and
- n and m are each independently 0, 1, 2, 3 or 4; wherein said phase is thermochromic.

2. A liquid crystalline phase or claim 1, wherein $R^1$ is an alkyl residue with up to 1 to 10 C atoms.

3. A liquid crystalline phase of claim 1 wherein n and m have the value 0.

4. A liquid crystalline phase according to claim 1, wherein Q is an alkylene residue with up to 7 C atoms or a single bond and Y is an alkyl residue with 2 to 7 C atoms.

5. In an electro-optic device containing a liquid crystalline phase, the improvement wherein said liquid crystalline phase is a phase according to claim 1.

6. In a temperature indicating device containing a liquid crystalline phase, the improvement wherein said liquid crystalline phase is a phase according to claim 1.

7. A liquid crystalline phase according to claim 1, wherein said compound is of the formula $$R^1\text{-Cyc-}CH_2-O-\text{Phe}-CO-O-\text{Phe}-R^2 \quad (Ia)$$

wherein Phe is a 1,4-phenylene group.

8. A liquid crystalline phase according to claim 1, wherein said compound is of the formula $$R^1-\text{Cyc}-CH_2-O-\text{Phex}-CO-O-\text{Phe}-R^2 \quad (Ib)$$

wherein Phe is a 1,4-phenylene group and PheX is a 1,4-phenylene group substituted by up to four methyl groups or halogen atoms.

9. A liquid crystalline phase according to claim 1, wherein said compound is of the formula $$R^1-\text{Cyc}-CH_2-O-\text{PheX}-CO-O-\text{PheX}-R^2 \quad (Ic)$$

wherein Phe is a 1,4-phenylene group and PheX is a 1,4-phenylene group substituted by up to four methyl groups or halogen atoms.

10. A liquid crystalline phase according to claim 1, wherein said compound is of the formula $$R^1-\text{Cyc}-CH_2-O-\text{Phe}-CO-O-\text{PheX}-R^2 \quad (Id)$$

wherein Phe is a 1,4-phenylene group and PheX is a 1,4-phenylene group substituted by up to four methyl groups or halogen atoms.

11. A liquid crystalline phase according to claim 1, wherein group $R^2$ is a chiral residue of the formula $$-(CH_2)_o-\underset{\underset{CH_3}{|}}{CH}-(CH_2)_p-CH_3, \quad (IIa)$$

$$-(CH_2)_o-O-\underset{\underset{CH_3}{|}}{CH}-(CH_2)_p-CH_3, \quad (IIb)$$

$$-(CH_2)_o-O-\underset{\underset{CH_3}{|}}{CH}-CO-O-(CH_2)_p-CH_3, \quad (IIc)$$

$$-(CH_2)_o-CO-\underset{\underset{CH_3}{|}}{CH}-O-(CH_2)_p-CH_3, \quad (IId)$$

$$-O-(CH_2)_o-\underset{\underset{CH_3}{|}}{CH}-(CH_2)_p-CH_3, \quad (IIe)$$

$$-\underset{\underset{CH_3}{|}}{CH}-(CH_2)_p-CH_3, \quad (IIf)$$

$$-O-\underset{\underset{CH_3}{|}}{CH}-(CH_2)_p-CH_3, \quad (IIg)$$

$$-CO-O-\underset{\underset{CH_3}{|}}{CH}-(CH_2)_p-CH_3, \quad (IIh)$$

$$-CO-O-\underset{\underset{CH_3}{|}}{CH}-CO-O-(CH_2)_p-CH_3, \quad (IIi)$$

$$-O-\underset{\underset{CH_3}{|}}{CH}-CO-O-(CH_2)_p-CH_3, \text{ or} \quad (IIj)$$

$$-O-CO-\underset{\underset{CH_3}{|}}{CH}-O-(CH_2)_p-CH_3. \quad (IIk)$$

12. A liquid crystalline phase comprising at least two components wherein at least one component is a compound of the formula:

$$R^1-\text{Cyc}-CH_2-O-\text{Phe}(X^1)_n-CO-O-\text{Phe}(X^2)_m-R^2$$

wherein
- $R^1$ is a normal or branched alkyl residue with up to 10 C atoms;
- $R^2$ is (S)-4-(2-methylbutyl);
- $X^1$ and $X^2$ are each independently a methyl group or a halogen atom; and n and m are each independently 0, 1, 2, 3, or 4, and wherein said phase is thermochromic.

13. A liquid crystalline phase according to claim 12, wherein said compound is (S)-4-(2-methylbutyl)-phenyl 4-(trans-4-ethylcyclohexylmethoxy)-benzoate;

(S)-4-(2-methylbutyl)-phenyl 4-(trans-4-propylcyclohexylmethoxy)-benzoate;

(S)-4-(2-methylbutyl)-phenyl 4-(trans-4-butylcyclohexylmethoxy)-benzoate;

(S)-4-(2-methylbutyl)-phenyl 4-(trans-4-hexylcyclohexylmethoxy)-benzoate;

(S)-4-(2-methylbutyl)-phenyl 4-(trans-4-heptylcyclohexylmethoxy)-benzoate;

(S)-4-(2-methylbutyl)-phenyl 4-(trans-4-octylcyclohexylmethoxy)-benzoate;

(S)-4-(2-methylbutyl)-2,3-difluorophenyl 4-(trans-4-ethylcyclohexylmethoxy)-benzoate;

(S)-4-(2-methylbutyl)-2,3-difluorophenyl 4-(trans-4-propylcyclohexylmethoxy)-benzoate;

(S)-4-(2-methylbutyl)-2,3-difluorophenyl 4-(trans-4-butylcyclohexylmethoxy)-benzoate;

(S)-4-(2-methylbutyl)-2,3-difluorophenyl 4-(trans-4-pentylcyclohexylmethoxy)-benzoate;

(S)-4-(2-methylbutyl)-2,3-difluorophenyl 4-(trans-4-hexylcyclohexylmethoxy)-benzoate;

(S)-4-(2-methylbutyl)-2,3-difluorophenyl 4-(trans-4-heptylcyclohexylmethoxy)-benzoate; or (S)-4-(2-methylbutyl)-2,3-difluorophenyl 4-(trans-4-octylcyclohexylmethoxy)-benzoate.

* * * * *